N. A. PATTERSON.
SCREW-PROPELLER.

No. 170,893.

2 Sheets—Sheet 1.

Patented Dec. 7, 1875.

WITNESSES
Chas. J. Gooch
Henry Tanner

INVENTOR
Newton Alexander Patterson
By Knight Bros. Attorneys

N. A. PATTERSON.
SCREW-PROPELLER.
No. 170,893. Patented Dec. 7, 1875.
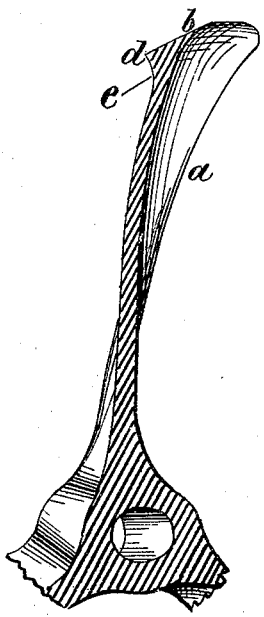
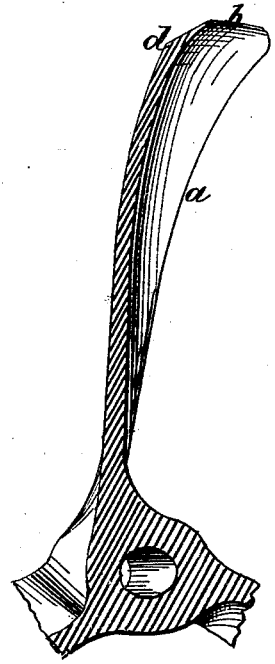
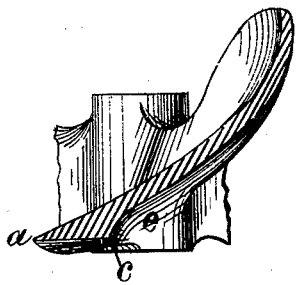
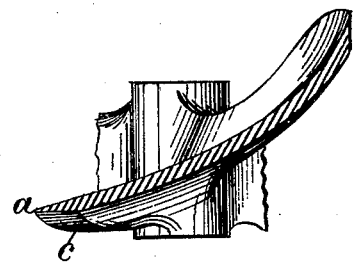
WITNESSES
Chas. J. Gooch
Henry Tanner
INVENTOR
Newton Alexander Patterson
By Knight Bros. Attorneys

UNITED STATES PATENT OFFICE.

NEWTON A. PATTERSON, OF JOHNSON, TENNESSEE.

IMPROVEMENT IN SCREW-PROPELLERS.

Specification forming part of Letters Patent No. 170,893, dated December 7, 1875; application filed April 23, 1875.

*To all whom it may concern:*

Be it known that I, NEWTON A. PATTERSON, of the city of Johnson, in the county of Washington and State of Tennessee, have invented certain new and useful Improvements in Screw-Propellers, of which the following is a specification:

This invention relates to improvements in what is known as the " Patterson Eagle-Wing Screw-Propeller," secured by Letters Patent Nos. 142,269 and 156,375, heretofore granted to me.

The improvements consist in adding thickness and rearward projection near the cutting-edge, and near the periphery of a concave-faced blade, such as is described in the aforesaid Letters Patent; the objects being, first, to adapt the blade, without impairing its propelling power, to back with greater effect; and, secondly, to increase the strength of the blade at the same time that its effectiveness is enhanced, as before stated.

Figure 1:
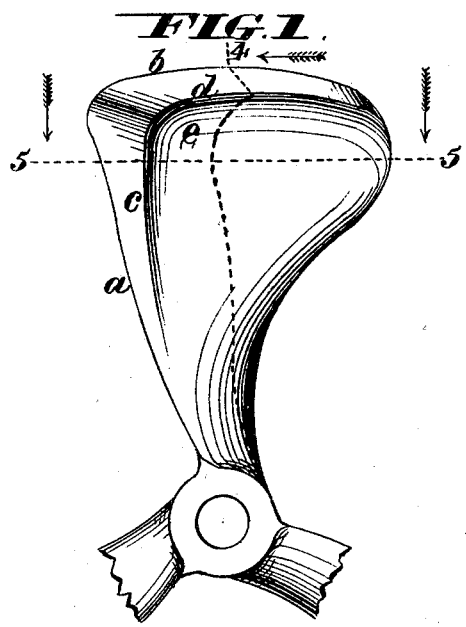
Figure 2:
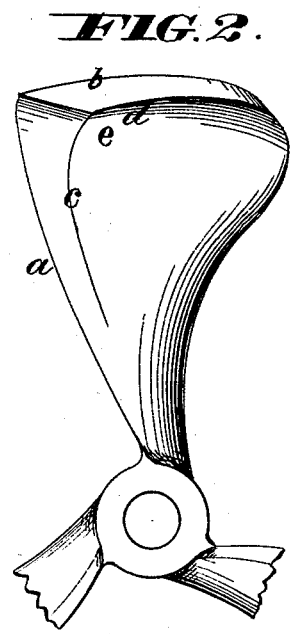
Figure 3:
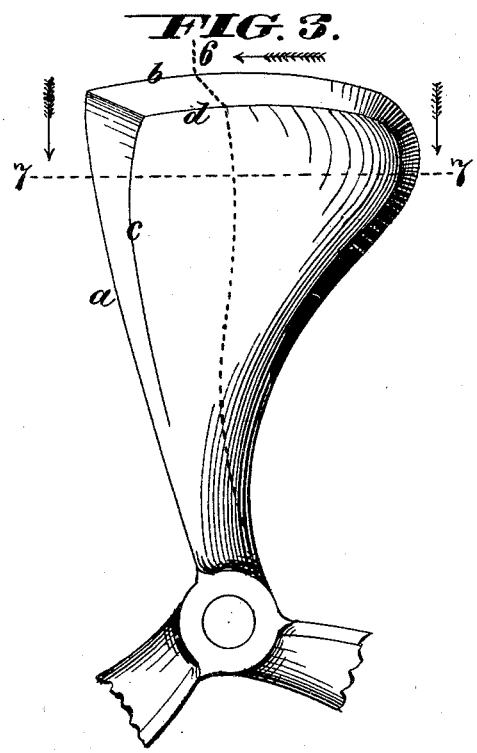

In the accompanying drawings, Figures 1, 2, and 3 are elevations of blades, illustrating the invention under different modifications in form. Fig. 4 is a longitudinal section on the line 4, Fig. 1. Fig. 5 is a transverse section on the line 5, Fig. 1. Fig. 6 is a longitudinal section on the line 6, Fig. 3. Fig. 7 is a transverse section on the line 7, Fig. 3.

The face of the blade may be formed substantially as represented and described in either of the various modifications set forth in my aforesaid patents. It is formed, toward the cutting-edge $a$, and toward the periphery $b$, with increased thickness, as clearly shown in the sectional views, forming at $a$ and $b$ bevels on the rear face at or near the edges, and preferably at $c$ marked prominences, producing an effective concavity, $e$, on the rear face of the blade, which, without impairing the forward-propelling force of the blade, greatly enhances its backing effect.

The objects and valuable effects of the above-described improvement may be stated briefly as follows:

First, by the added thickness or elevation of the back surface near the forward, rear, and outer margins, a plane or concave back surface is formed, possessing backing force under reverse motion almost equal to the propelling force possessed by the screw in going forward.

Second, the added thickness gives largely-increased strength to the blade.

The first-stated feature of advantage applies largely to tugs, launches, and yachts, which are often backed, or required to stop quickly.

The second feature of advantage applies specially to screws for large vessels, where peculiar strength of blade is required; and the features have like value for all screws operating in ice-fields, canals, or other places where obstructions come in frequent contact with the blades.

It will be noted that, as represented in the drawing, the added metal is located at that part of the back of the blade covered fully by the front surface as the screw revolves forward.

It is well known that in the ordinary action of a screw-propeller a partial vacuum is created at the back of the blades, and no friction occurs there. Hence, no retarding friction is created in consequence of the addition of metal at back.

The illustration showing a curved or concave back near the periphery is regarded as the best form. The invention is not restricted to any special degree or proportion of added thickness, the addition depending on the measure of backing force required.

In common with the invention on which this form is an improvement, the present invention is applicable to screw-propellers for vessels of various sizes and capacities, the blades of larger screws, and those for more rapid propulsion, being formed of greater length in proportion to their width than screws for smaller or slower vessels.

The following is claimed as new:

The concave-faced propelling-blade, formed with increased thickness toward one or more of its edges, to produce a flat or concave rear surface, substantially as and for the purposes set forth.

N. A. PATTERSON.

Witnesses:
 OCTAVIUS KNIGHT,
 F. E. SMITH.